United States Patent
Hu et al.

(10) Patent No.: US 7,042,682 B2
(45) Date of Patent: May 9, 2006

(54) FULLY SHIELDED PERPENDICULAR RECODING WRITER

(75) Inventors: Hung Liang Hu, Los Altos Hills, CA (US); Yaw Shing Tang, Saratoga, CA (US); Liji Guan, Milpitas, CA (US); Kochan Ju, Montesereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 242 days.

(21) Appl. No.: 10/688,046

(22) Filed: Oct. 17, 2003

(65) Prior Publication Data

US 2005/0083605 A1   Apr. 21, 2005

(51) Int. Cl.
*G11B 5/127* (2006.01)
(52) U.S. Cl. .................................. 360/317
(58) Field of Classification Search ............. 360/317, 360/318, 125
See application file for complete search history.

(56) References Cited

U.S. PATENT DOCUMENTS

| | | | |
|---|---|---|---|
| 4,547,824 A * | 10/1985 | Best et al. ............... 360/318 |
| 4,656,546 A | 4/1987 | Mallory .................. 360/110 |
| 4,881,143 A * | 11/1989 | Bhattacharyya et al. .... 360/319 |
| 4,935,832 A * | 6/1990 | Das et al. ................ 360/112 |
| 5,003,423 A | 3/1991 | Imamura et al. ........... 360/125 |
| 5,075,956 A | 12/1991 | Das ........................ 29/603 |
| 5,311,387 A * | 5/1994 | Mallory .................. 360/126 |
| 5,515,221 A | 5/1996 | Gill et al. |
| 5,621,592 A | 4/1997 | Gill et al. |
| 6,842,313 B1* | 1/2005 | Mallory .................. 360/319 |
| 2002/0071208 A1* | 6/2002 | Batra et al. ............. 360/125 |
| 2002/0176214 A1* | 11/2002 | Shukh et al. ............ 360/317 |
| 2004/0100737 A1* | 5/2004 | Nakamoto et al. ........ 360/319 |
| 2004/0212923 A1* | 10/2004 | Taguchi ................. 360/125 |
| 2005/0068669 A1* | 3/2005 | Hsu et al. ............... 360/125 |
| 2005/0068671 A1* | 3/2005 | Hsu et al. ............... 360/125 |
| 2005/0068678 A1* | 3/2005 | Hsu et al. ............... 360/126 |
| 2005/0141142 A1* | 6/2005 | Mochizuki et al. ........ 360/319 |

\* cited by examiner

*Primary Examiner*—Allen Cao
(74) *Attorney, Agent, or Firm*—George O. Saile; Stephen B. Ackerman

(57) ABSTRACT

Conventional perpendicular writers that utilize an extended return pole are subject to large flux leakage. This problem has been reduced in the prior art by adding a downstream shield. This still leaves significant upstream leakage. This has now been eliminated by adding an upstream shield and then connecting the up and downstream shields by using side shields. The latter need not extend all the way from the downstream to the upstream shield in which case their thickness is increased relative to the full side shields.

32 Claims, 4 Drawing Sheets

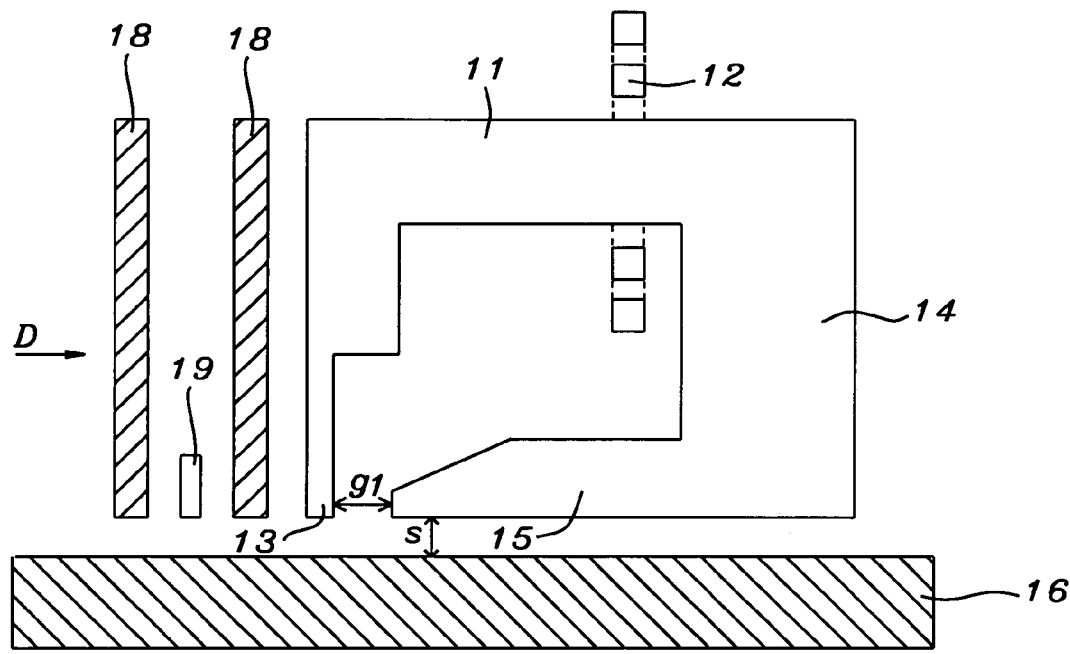
FIG. 1 – Prior Art
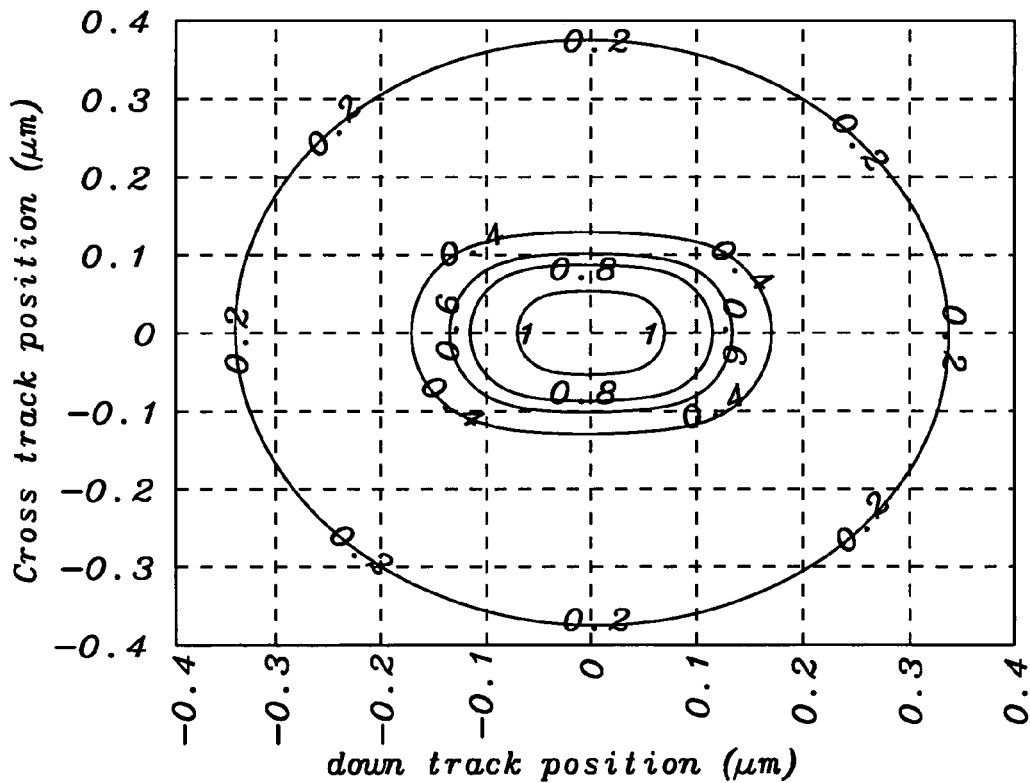
FIG. 2a – Prior Art

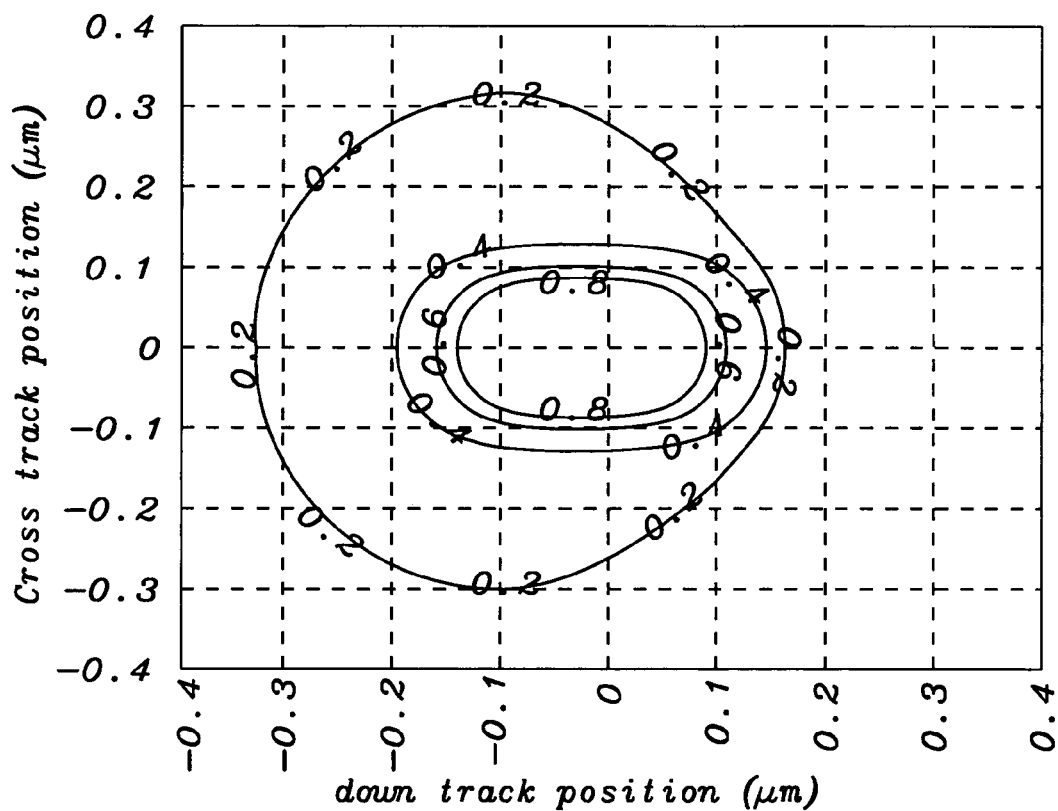
FIG. 2b – Prior Art
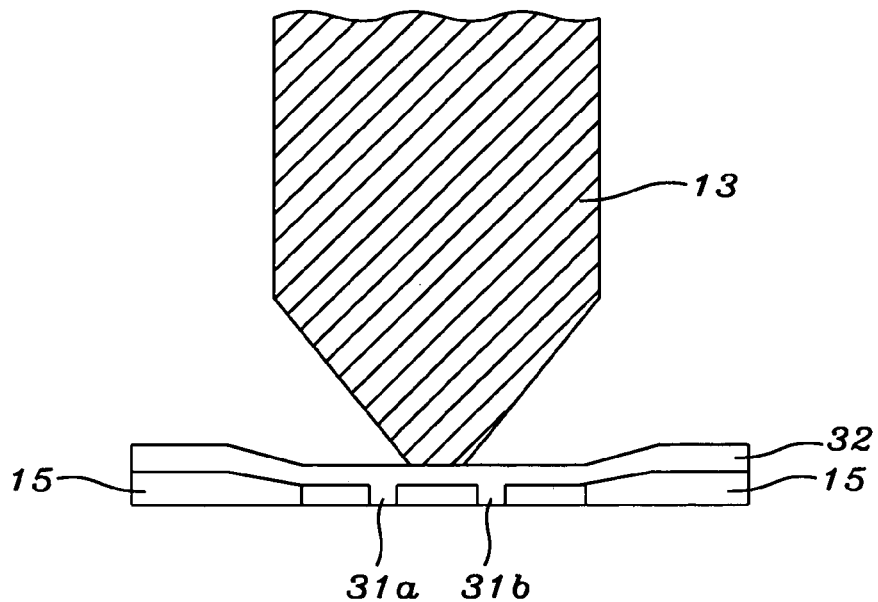
FIG. 3

FULLY SHIELDED PERPENDICULAR RECODING WRITER

FIELD OF THE INVENTION

The invention relates to the general field of magnetic disk systems with particular reference to magnetic write heads for perpendicular designs, more specifically to flux leakage from the write pole.

BACKGROUND OF THE INVENTION

Perpendicular magnetic recording (PMR) is important for the future of the magnetic recording industry because it offers higher areal density than the current longitudinal magnetic recording (LMR). This is due to the fact that the P medium is thermally more stable than that used for LMR. At present, LMR has achieved over 100 Gigabits per square inch (Gbpsi) in the laboratory and more than 60 Gpsi in products currently offered at the market place. In order to further extend the LMR recording density, two main obstacles have to be overcome. The first one is the thermal stability of the LMR recording media which arises because its thickness has to decrease to the extent that thermal energy could randomize the recorded bits. The second one is the ongoing increase in the write field needed to record on the high coercivity LMR media.

This high coercivity is needed to achieve high bit resolution and good thermal stability. Both obstacles to LMR could be considerably lowered if PMR were deployed instead. Thicker PMR media with a magnetically soft underlayer film (SUL), could be used to alleviate the thermal stability problem. A PMR writer provides a larger write field than that of LMR, which is limited to the fringe field from its write gap.

An example of a perpendicular writer of the prior art is shown in FIG. 1. Magnetic yoke 11 is surrounded by field coil 12 and includes main pole 13 that terminates as a write pole tip at the recording surface. Return pole 14 conveys the magnetic flux generated by coil 12 down to within a distance S of the recording surface 16 while downstream shield 15, running parallel to the recording surface, completes the magnetic circuit with the exception of gap g1 into which some of the write field is diverted. The main flux passes through recording layer 17, into SUL 16, and then back up into downstream shield 15 on the far side of g1.

One of the problems for a PMR writer of the type seen in FIG. 1 is the extent to which its write field spreads to its surroundings, thereby jeopardizing the stability of the recording bits. One approach to dealing with this has been the approach described above namely the introduction of a downstream shield (15 in FIG. 1) that is separated by a small gap (g1) from the PMR write pole so as to minimize the amount of flux returned from the PMR media. However, we have found that this solution to the wide spreading fringe fields problem is not quite adequate.

As shown in the attached simulation plots:—FIG. 2a shows the field plots for a single pole writer without a downstream shield while FIG. 2b shows the field plots for a single pole writer with a downstream shield, with the left side of the graph relating to the downstream end (i.e. the mirror reflection of FIG. 1). It is clear that the downstream shield has indeed reduced side fringing in the downstream fields, but there is still a large side fringing field spread on the upstream side, affecting the adjacent track recording bits. In this case, there could be as much as 20% of the maximum write field applied to the adjacent upstream tracks which could cause its randomization after repeated writing in the presence of thermal disturbance. Such a situation is obviously very undesirable for high track density recording.

A routine search of the prior art was performed with the following references of interest being found:

In U.S. Pat. No. 4,656,546 (Mallory) describe a downstream shield. In U.S. Pat. No. 5,003,423, Imamura et al disclose pole shields on the sides, upstream, and downstream. Das, in U.S. Pat. No. 5,075,956, shows a magnetic pole with side shields. Gill et al in U.S. Pat. No. 5,621,592 and also in U.S. Pat. No. 5,515,221, teach laminated shield layers.

SUMMARY OF THE INVENTION

It has been an object of at least one embodiment of the present invention to provide a magnetic writer suitable for vertical recording.

Another object of at least one embodiment of the present invention has been that said writer have minimal upstream and downstream flux leakage.

These objects have been achieved by adding upstream and side magnetic shields to the prior art structure and then connecting up and downstream shields by means of magnetic side shields. The latter need not extend all the way from the downstream to the upstream shield in which case their thickness is increased relative to full side shields.

BRIEF DESCRIPTION OF THE DRAWINGS

FIG. 1 shows a vertical magnetic writer of the prior art.

FIG. 2a is a field plot in the vicinity of the write pole showing that there is substantial magnetic field leakage in both the up and downstream directions.

FIG. 2b is a field plot in the vicinity of the write pole showing that the addition of a downstream shield can significantly reduce downstream leakage but significant upstream leakage is still present.

FIG. 3 is a frontal view of the write pole showing the up and downstream shields.

DESCRIPTION OF THE PREFERRED EMBODIMENTS

Figure 4:
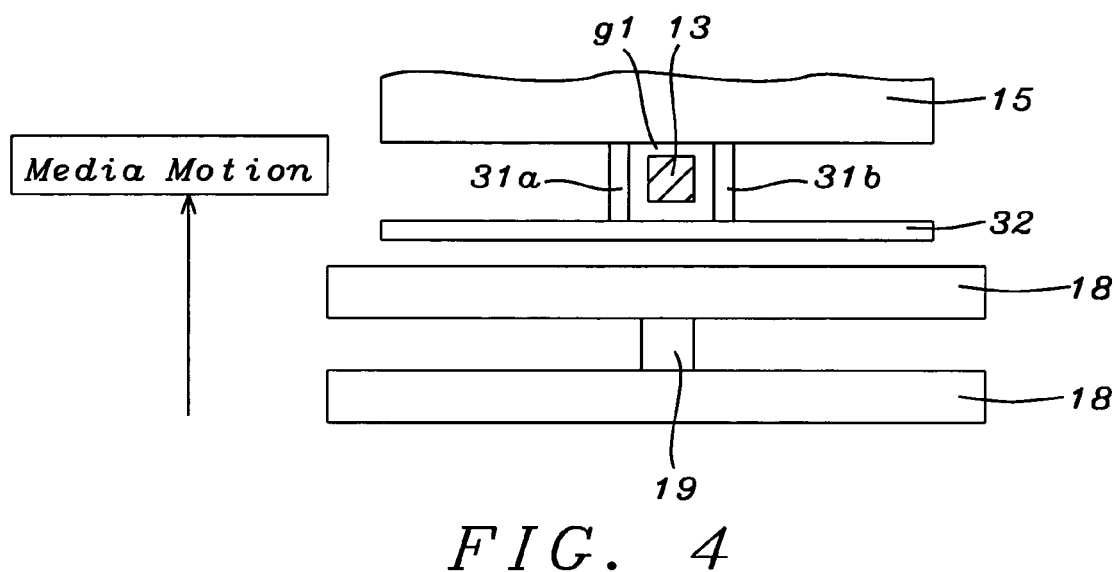
FIG. 4 is an ABS view of a first embodiment of the invention

In this invention, we disclose a perpendicular magnetic writer design with magnetic shields at both the leading and trailing edges of the write pole, together with side shields.

The invention has been realized in two embodiments. We start our description with the portion of these structures that is common to both of them:

Referring initially to FIG. 1, magnetic yoke 11 is surrounded by field coil 12 and includes main pole 13 that terminates as a write pole tip at the recording surface 17. Return pole 14 conveys the magnetic flux generated by coil 12 down to within a distance S of the recording surface while downstream shield 15, running parallel to the recording surface, completes the magnetic circuit with the exception of gap g1 into which some of the write field is diverted. The main part of the flux passes through recording layer 17, into SUL 16, and then back up into downstream shield 15 on the far side of g1. Also seen in the figure is the read head assembly that comprises read head 19—usually a GMR (Giant Magneto-Resistance) head—which is magnetically shielded from both sides by read head shields 18 that are situated a short distance upstream from write pole 13. Note that the terms 'up' and 'down' stream refer to which part of the assembly reaches a given spot on the recording surface first.

1$^{st}$ Embodiment

Referring now to FIG. 3, we show a view of write pole 13 as it would be seen when looking in direction D (of FIG. 1). Also seen in FIG. 3 is downstream shield 15 lying in a plane below that of the figure. This corresponds to what is shown in FIG. 1, but, in a departure from the prior art, upstream shield 32 has been inserted parallel to shield 15 located between write pole 13 and the closest of the two read head shields 18, so that it lies in a plane above that of the figure.

An important additional novel feature is illustrated in FIG. 4. This is the inclusion of side shields 31a and 31b that magnetically connect the up and down stream shields to one another so the write head is now fully shielded on all four sides. This can be seen more clearly in FIG. 4 which is an ABS view of the structure in the vicinity of the write pole i.e. the view seen when looking up at the Air Bearing Surface (that parallels layer 17).

The spacing between upstream shield 32 and write pole 13 is between about 0.1 and 1 microns while the spacing between downstream shield 15 and write pole 13 is between about 0.03 and 0.2 microns. Side shields 31a and 31b are located between about 0.05 and 0.2 microns from write pole 13 and they are between about 0.1 and 5 microns wide (along a direction normal to the plane of the figure). As a result, the bottom surfaces of the side shields will, in general, be coplanar with the write pole's bottom surface.

Figure 6:
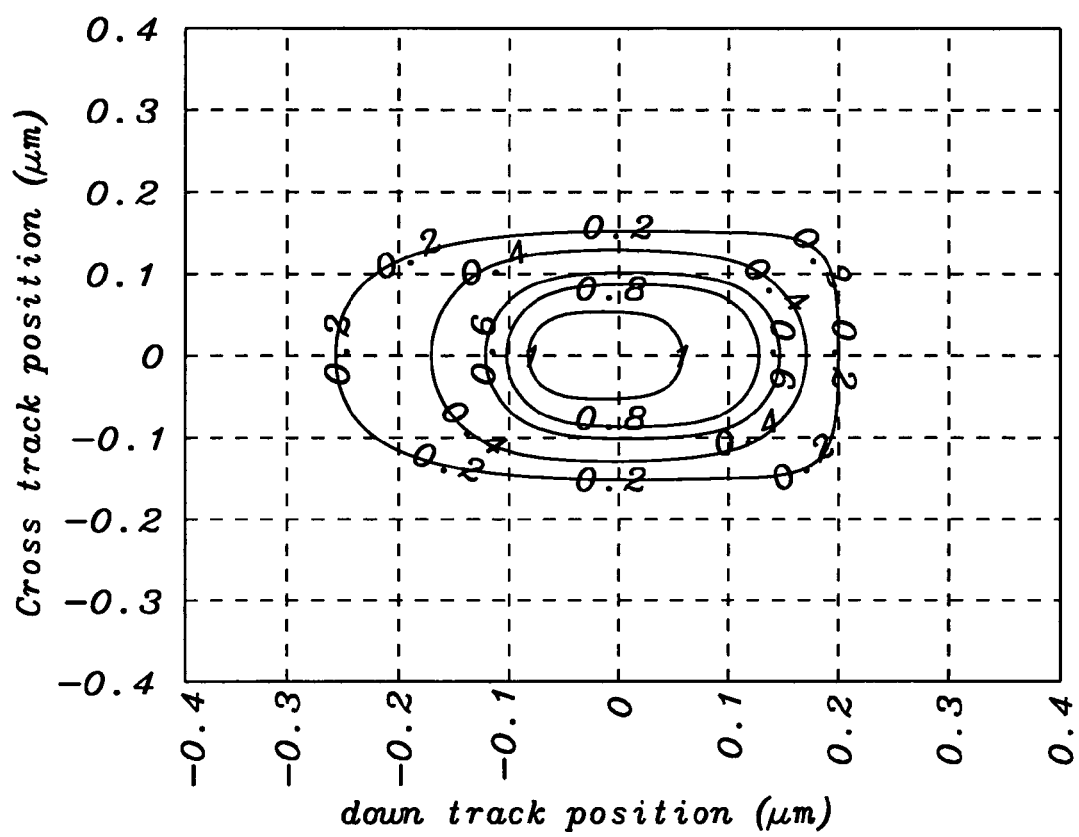
FIG. 6 is a field plot in the vicinity of the write pole, for the present invention, confirming that there is now negligible magnetic flux leakage in both the up and downstream directions.

For the first embodiment, the upstream leakage outside said side shields is less than about 10% while the downstream leakage outside the side shields is less than about 10%. A detailed field plot of for the area immediately around the write pole can be seen in FIG. 6. This much improved magnetic isolation of the write pole makes it possible for write fields of up to about 12 kOe to be utilized.

2$^{nd}$ Embodiment

Figure 5:
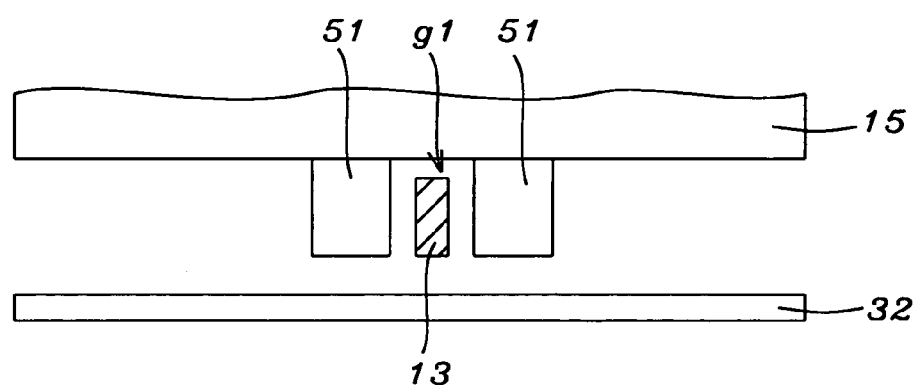
FIG. 5 is an ABS view of a second embodiment of the invention

This embodiment is the same in its appearance as the first embodiment when viewed in direction D i.e. as seen in FIG. 3 The differences between the first and second embodiments become clear by looking at FIG. 5 which, like FIG. 4, is an ABS view. In this case, the side shields (now designated as 51) are magnetically connected to downstream shield 15 but do not extend all the way to upstream shield 32. Typically, side shields 51 extend from downstream shield 15 to within 1 micron of upstream shield 32. Because of this, it is necessary that they be thicker than 31a and 31b, typically having thicknesses between about 0.1 and 5 microns.

For the second embodiment, the upstream leakage outside the side shields is less than about 10% while the downstream leakage outside the side shields is less than about 10%. A detailed field plot for the area immediately around the write pole can be seen in FIG. 6. This much improved magnetic isolation of the write pole makes it possible for write fields of up to about 12 kOe to be utilized.

What is claimed is:

1. A method to eliminate downstream flux leakage from a perpendicular magnetic writer, comprising:
    providing a magnetic yoke having first and second non-parallel parts, said first part terminating as a downstream shield having a planar lower surface;
    providing a conductive coil that surrounds said yoke;
    providing a main pole having first and second ends;
    the first end of the main pole being in magnetic contact with the magnetic yoke's second part, extending therefrom so that its second end is a perpendicular write pole having a bottom surface that is coplanar with said downstream shield lower surface;
    said downstream shield being spaced a first distance from said write pole;
    providing a read head shield located upstream from said write pole;
    inserting an upstream shield between the write pole and the read head shield, said upstream shield being spaced a second distance from the write pole; and
    magnetically connecting said upstream and downstream shields by means of side shields located on opposing sides of the write pole.

2. The method described in claim 1 wherein said first distance, between said downstream shield and said write pole, is between about 0.03 and 0.2 microns.

3. The method described in claim 1 wherein said second distance, between said upstream shield and said write pole, is between about 0.1 and 1 microns.

4. The method described in claim 1 wherein upstream leakage outside said side shields is less than about 10%.

5. The method described in claim 1 wherein downstream leakage outside said side shields is less than about 10%.

6. The method described in claim 1 wherein said write pole can safely provide a write field of up to about 12 kOe.

7. The method described in claim 1 wherein said side shields are between about 0.05 and 0.2 microns from said write pole.

8. The method described in claim 1 wherein said side shields are between about 0.1 and 5 microns wide.

9. The method described in claim 1 wherein said side shields have bottom surfaces that are coplanar with said write pole bottom surface.

10. A method to eliminate downstream flux leakage from a perpendicular magnetic writer, comprising:
    providing a magnetic yoke having first and second non-parallel parts, said first part terminating as a downstream shield having a planar lower surface;
    providing a conductive coil that surrounds said yoke;
    providing a main pole having first and second ends;
    the first end of the main pole being in magnetic contact with the magnetic yoke's second part, extending therefrom so that its second end is a perpendicular write pole having a bottom surface that is coplanar with said downstream shield lower surface;
    said downstream shield being spaced a first distance from said write pole;
    providing a read head shield located upstream from said write pole;
    inserting an upstream shield between the write pole and the read head shield, said upstream shield being spaced a second distance from the write pole; and
    attaching to said downstream shield side shields located on opposing sides of the write pole and having a thickness of at least 0.1 microns, that extend from said downstream shield to within 1 micron of said upstream shield.

11. The method described in claim 10 wherein said first distance, between said downstream shield and said write pole, is between about 0.03 and 0.2 microns.

12. The method described in claim 10 wherein said second distance, between said upstream shield and said write pole, is between about 0.1 and 1 microns.

13. The method described in claim 10 wherein upstream leakage outside said side shields is less than about 10%.

14. The method described in claim 10 wherein downstream leakage outside said side shields is less than about 10%.

15. The method described in claim 10 wherein said write pole can safely provide a write field of up to about 12 kOe.

16. The method described in claim 10 wherein said side shields are between about 0.05 and 0.2 microns from said write pole.

17. The method described in claim 10 wherein said side shields are between about 0.1 and 1 microns wide.

18. The method described in claim 10 wherein said side shields have bottom surfaces that are coplanar with said write pole bottom surface.

19. A perpendicular magnetic writer, comprising:
  a magnetic yoke having first and second non-parallel parts, said first part terminating as a downstream shield having a planar lower surface;
  a conductive coil that surrounds said yoke;
  a main pole having first and second ends;
  the first end of the main pole being in magnetic contact with the magnetic yoke's second part, extending therefrom so that its second end is a perpendicular write pole having a bottom surface that is coplanar with said downstream shield lower surface;
  said downstream shield being spaced a first distance from said write pole;
  a read head shield located upstream from said write pole;
  an upstream shield between the write pole and the read head shield, said upstream shield being spaced a second distance from the write pole; and
  side shields, on opposing sides of the write pole, that magnetically connect said upstream and downstream shields.

20. The magnetic writer described in claim 19 wherein said first distance, between said downstream shield and said write pole, is between about 0.03 and 0.2 microns.

21. The magnetic writer described in claim 19 wherein said second distance, between said upstream shield and said write pole, is between about 0.1 and 1 microns.

22. The magnetic writer described in claim 19 wherein upstream leakage outside said side shields is less than about 10%.

23. The magnetic writer described in claim 19 wherein downstream leakage outside said side shields is less than about 10%.

24. The magnetic writer described in claim 19 wherein said write pole can safely provide a write field of up to about 12 kOe.

25. The magnetic writer described in claim 19 wherein said side shields are between about 0.05 and 0.2 microns from said write pole.

26. The magnetic writer described in claim 19 wherein said side shields are between about 0.1 and 5 microns wide.

27. The magnetic writer described in claim 19 wherein said side shields have bottom surfaces that are coplanar with said write pole bottom surface.

28. A perpendicular magnetic writer, comprising:
  a magnetic yoke having first and second non-parallel parts, said first part terminating as a downstream shield having a planar lower surface;
  a conductive coil that surrounds said yoke;
  a main pole having first and second ends;
  the first end of the main pole being in magnetic contact with the magnetic yoke's second part, extending therefrom so that its second end is a perpendicular write pole having a bottom surface that is coplanar with said downstream shield lower surface;
  said downstream shield being spaced a first distance from said write pole;
  a read head shield located upstream from said write pole;
  an upstream shield between the write pole and the read head shield, said upstream shield being spaced a second distance from the write pole; and
  attached to said downstream shield, side shields, located on opposing sides of the write pole and having a thickness of at least 0.1 microns, that extend from said downstream shield to within 1 microns of said upstream shield.

29. The magnetic writer described in claim 28 wherein said first distance, between said downstream shield and said write pole, is between about 0.03 and 0.2 microns.

30. The magnetic writer described in claim 28 wherein said second distance, between said upstream shield and said write pole, is between about 0.1 and 1 microns.

31. The magnetic writer described in claim 28 wherein upstream leakage outside said side shields is less than about 10%.

32. The magnetic writer described in claim 28 wherein downstream leakage outside said side shields is less than about 10%.

* * * * *

UNITED STATES PATENT AND TRADEMARK OFFICE
CERTIFICATE OF CORRECTION

PATENT NO.        : 7,042,682 B2                                    Page 1 of 1
APPLICATION NO. : 10/688046
DATED             : May 9, 2006
INVENTOR(S)       : Hung Liang Hu et al.

It is certified that error appears in the above-identified patent and that said Letters Patent is hereby corrected as shown below:

ON The Title page, in Item (75), delete third Inventor "Liji Guan, Milpitas, Ca (US)" and replace with -- Lijie Guan, Milpitas, CA (US) --.

Signed and Sealed this

Eighth Day of August, 2006

JON W. DUDAS
*Director of the United States Patent and Trademark Office*